United States Patent
Kim

(10) Patent No.: US 12,530,988 B2
(45) Date of Patent: Jan. 20, 2026

(54) MANNEQUIN FOR CARDIOPULMONARY RESUSCITATION TRAINING

(71) Applicant: BESTCPR, INC., Gimpo-si (KR)

(72) Inventor: Gi-Chang Kim, Goyang-si (KR)

(73) Assignee: BESTCPR, INC., Gimpo-si (KR)

( * ) Notice: Subject to any disclaimer, the term of this patent is extended or adjusted under 35 U.S.C. 154(b) by 362 days.

(21) Appl. No.: 18/242,524

(22) Filed: Sep. 6, 2023

(65) Prior Publication Data

US 2023/0410687 A1    Dec. 21, 2023

Related U.S. Application Data

(63) Continuation of application No. PCT/KR2023/005975, filed on May 2, 2023.

(30) Foreign Application Priority Data

May 9, 2022    (KR) .......................... 10-2022-0056513

(51) Int. Cl.
G09B 23/28    (2006.01)
G01V 8/10    (2006.01)

(52) U.S. Cl.
CPC ............. G09B 23/288 (2013.01); G01V 8/10 (2013.01)

(58) Field of Classification Search
CPC ................................ G09B 23/288; G01V 8/10
See application file for complete search history.

(56) References Cited

U.S. PATENT DOCUMENTS

2011/0040217 A1*    2/2011    Centen ................. A61B 5/0064
                                                          601/41
2018/0322808 A1*    11/2018    Kim ...................... G09B 23/32

FOREIGN PATENT DOCUMENTS

KR         10-1605383 B1       3/2016
KR     10-2019-0014308 A       2/2019

* cited by examiner

Primary Examiner — Robert P Bullington
(74) Attorney, Agent, or Firm — PnK IP LLC

(57) ABSTRACT

A mannequin for cardiopulmonary resuscitation training, the mannequin includes: a torso case (102); a torso cover (104); a head case (106); a head cover (108); a spring (110); a first column (112); a second column (114); a pivoting arm (118); a sensor case (132); a first infrared sensor (134) and a second infrared sensor (136); and a blocking plate (140), wherein, when the blocking plate (140) moving in an up and down direction covers a front surface of the sensor case (132), the first infrared sensor (134) and the second infrared sensor (136) check a state in which infrared rays are not sensed, and then transmit the state to a control portion. Accordingly, when cardiopulmonary resuscitation is performed, it is possible to easily and accurately determine how deep the compression is, and to accurately sense whether the direction of compression is perpendicular to the ground, so trainees learning cardiopulmonary resuscitation can undergo an accurate training.

4 Claims, 15 Drawing Sheets

MANNEQUIN FOR CARDIOPULMONARY RESUSCITATION TRAINING

CROSS REFERENCE TO RELATED APPLICATION

This application is a Bypass Continuation of International Application No. PCT/KR2023/005975, filed on May 2, 2023, and claims priority from and the benefit of Korean Patent Application No. 10-2022-0056513, filed on May 9, 2022, each of which is incorporated by reference for all purposes as if fully set forth herein.

BACKGROUND

Field

Embodiments of the invention relate generally to a mannequin for cardiopulmonary resuscitation training, and more specifically, to a mannequin for cardiopulmonary resuscitation training in which a magnet is installed at a distal end of a pivoting arm that pivots in an up and down direction inside the mannequin, two sensors are installed at different heights of two columns such that the position of the pivoting arm is grasped, and a pair of multiple infrared sensors are installed left and right on the path through which a vertically moving vertical sensor passes to check whether the vertical sensor moves in a vertical direction and whether a trainee is performing cardiopulmonary resuscitation in accordance with the regulations in real time.

Discussion of the Background

Cardiopulmonary resuscitation is a procedure that resuscitates and restores cardiopulmonary function when cardiopulmonary function is seriously degraded or stopped. Normally, for respiratory dysfunction or respiratory arrest, an operator first secures airway, performs artificial respiration, and performs heart massage to restore a cardiac function.

Artificial respiration is performed when the heart is running but breathing is stopped, resulting in a state of suspended animation in an event of falling into the water, poisoning or bleeding, in order to artificially revitalize the function of the lungs such that breathing is maintained normally. The artificial respiration as the first life-saving treatment includes a breathing-in method of blowing an exhalation of an operator into the lungs of a patient, and a manual artificial respiration method in which an operator compresses a chest of a patient by using a hand to cause inhalation and exhalation. The general breathing-in method involves a mouth-to-mouth method that expands the lungs of a patient with air infused through the mouth to the patient.

Further, cardiopulmonary resuscitation is used to revitalize a cardiac function when the heart stops beating due to falls, electric shocks, or poisoning. Cardiopulmonary resuscitation is a closed-chest cardiac massage in which an operator compresses the heart by pressing the breast bone down about 5 cm to 6 cm toward the vertebrae to eject blood. Closed-chest cardiac massage is generally referred to as cardiac massage.

In cardiopulmonary resuscitation, an operator first secures the airway of a patient and checks whether the patient is breathing. In case of apnea, the operator performs artificial respiration. In case of cardiac arrest, the operator begins heart massage while continuing to perform artificial respiration. Since such cardiopulmonary resuscitation is performed on a human body, it is difficult for an operator or a trainee to repeatedly practice the aforementioned procedure.

Recently, devices for practicing artificial respiration and cardiopulmonary resuscitation using a mannequin shaped like a human body have been disclosed.

FIG. 1 is a perspective view showing the structure of a mannequin for training according to the related art.

As illustrated in FIG. 1, the training mannequin includes a mannequin 10 in the shape of a human chest and head, a cardiopulmonary resuscitation checking portion 20 installed inside the mannequin 10, wherein the cardiopulmonary resuscitation checking portion 20 generates a certain checking sound when the chest is compressed to inform the successful implementation of cardiopulmonary resuscitation training, and an air bag 30 representing a lung organ of a human body.

The mannequin 10 includes a back plate 40 representing the shape of the back, a chest plate 50 representing the shape of the chest, and a head 60 representing the shape of the head. The back plate 40 has a predetermined space for installing therein the cardiopulmonary resuscitation checking portion 20 and the air bag 30, and is in the form of a cabinet with an open front surface. The chest plate 50 is in the form of a plate having a predetermined width so as to open and close the back plate 40. The head 60 is coupled to an upper end of the back plate 40. A pivoting portion 62 having a shape of a human jaw is installed at a front lower end of the head 60. The pivoting portion 62 may pivot up and down.

Between the back plate 40 and the chest plate 50, a compression spring 70 is installed at the center so that the chest plate 50 has elasticity with respect to an external force. Accordingly, when the chest plate 50 is compressed inward, the chest plate 50 moves inwardly while receiving a constant resistance from the compression spring 70. A stopper protrudes upward from a lower portion of the back plate 40.

The cardiopulmonary resuscitation checking portion 20 includes a leaf spring having a convex portion at one side and a support bracket 26 for supporting the leaf spring.

The support bracket 26 is spaced apart from the back plate 40 by a predetermined distance. The leaf spring is installed at a position corresponding to the stopper. The convex portion of the leaf spring is installed so as to face the stopper so that the cardiopulmonary resuscitation checking portion 20 makes a sound when the leaf stopper collides with the stopper.

Further, in the chest plate 50, a compression portion 52 for compressing the leaf spring is installed at a position corresponding to the stopper and the leaf spring. Accordingly, when the chest plate 50 is pressed from the outside, the compression portion 52 compresses the leaf spring, and a sound is generated.

In the case where cardiopulmonary resuscitation training is performed in such a manner using the mannequin 10, when a trainee presses the chest plate 50 of the mannequin 10 with a strong force and a sound is heard from the leaf spring, a proper compression is deemed to be made. However, when the position of the leaf springs is changed, or when the mannequin 10 is used for a long time, the sound may be poor or the sound may be too small, so that the trainee or the instructor may not notice successful operation.

In addition, accurate cardiopulmonary resuscitation is performed when a trainee presses the chest plate 50 in a vertical direction, but it is not possible to check whether the motion of the trainee is an accurate vertical movement. Hence, there is an issue that accurate training performance analysis is insufficient.

The above information disclosed in this Background section is only for understanding of the background of the inventive concepts, and, therefore, it may contain information that does not constitute prior art.

SUMMARY

The present disclosure provides a mannequin for cardiopulmonary resuscitation training in which a pivoting arm is installed inside a mannequin made in the shape of a human upper body so as to pivot up and down according to the compression of a trainee, two sensors are installed at different heights in an up and down direction, and a magnet that reciprocates between the two sensors is used to check whether the height of the pivoting arm and whether a trainee is performing compression and relaxation to a sufficient depth and height.

Further, the present disclosure provides a mannequin for cardiopulmonary resuscitation training in which it is checked whether the cardiopulmonary resuscitation performed by a trainee is performed with the accurate depth and period to display the same in video and audio, and a blocking bar that moves up and down along with a torso cover is installed to check the quality of cardiopulmonary resuscitation in real time by sensing whether the direction of compression is perpendicular to the ground.

Additional features of the inventive concepts will be set forth in the description which follows, and in part will be apparent from the description, or may be learned by practice of the inventive concepts.

According to one aspect of the invention, a training mannequin configured of a head and a torso used to teach trainees cardiopulmonary resuscitation, the mannequin includes: a torso case having an open front surface and an inner space formed therein; a torso cover manufactured similar to a frontal appearance of a human upper body while covering the front surface of the torso case; a head case being connected to one side of the torso case and having an inner space formed therein; a head cover manufactured similar to a frontal appearance of a human face while covering the front surface of the head case; a spring installed on an inner bottom surface of the torso case to exert an elastic force to lift the torso cover upward; a first column installed on the inner bottom surface of the torso case, wherein the first column is installed with a first sensor for sensing a magnetic force; a second column installed on the inner bottom surface of the torso case, wherein the second column is installed with a second sensor and a third sensor for sensing a magnetic force at a relatively lower height than the first sensor; and a pivoting arm 118 installed on the inner bottom surface of the torso case, wherein the pivoting arm has a distal end reciprocating in an up and down direction and a magnet installed at the distal end, wherein the second sensor is installed at a relatively higher position than the third sensor; the distal end of the pivoting arm reciprocates in an up and down direction by a predetermined angle along a portion of an arc between the first column and the second column; the first sensor, the second sensor, and the third sensor sense whether a magnetic force is applied according to approach of the magnet; and in a practice process of cardiopulmonary resuscitation, a control portion determines over-compression when the magnet is lowered down and then passes by the third sensor while the pivoting arm reciprocates, and displays the same as a video or voice.

The control portion determines that the magnet may have passed by the third sensor when the magnetic force of the magnet disappears after being sensed by the second sensor and is sensed as a maximum value by the third sensor.

According to another aspect of the invention, a training mannequin configured of a head and a torso used to teach trainees cardiopulmonary resuscitation, the mannequin includes: a torso case having an open front surface and an inner space formed therein; a torso cover manufactured similar to a frontal appearance of a human upper body while covering the front surface of the torso case; a head case being connected to one side of the torso case and having an inner space formed therein; a head cover manufactured similar to a frontal appearance of a human face while covering the front surface of the head case; a spring installed on an inner bottom surface of the torso case to exert an elastic force to lift the torso cover upward; a first column installed on the inner bottom surface of the torso case, wherein the first column is installed with a first sensor for sensing a magnetic force; a second column installed on the inner bottom surface of the torso case, wherein the second column is installed with a second sensor for sensing a magnetic force at a relatively lower height than the first sensor; a pivoting arm installed on the inner bottom surface of the torso case, wherein the pivoting arm has a distal end reciprocating in an up and down direction and a magnet installed at the distal end; a sensor case installed to protrude from the inner bottom surface of the torso case; a first infrared sensor and a second infrared sensor installed to be spaced apart in a left and right direction in the sensor case; and a blocking plate that is connected to an undersurface of the torso cover, moves in an up and down direction according to a compression motion of the torso cover, and blocks sensing of the first infrared sensor or the second infrared sensor while being lowered down by the compression motion of a trainee, wherein the first infrared sensor and the second infrared sensor check a state in which infrared rays are not sensed when the blocking plate moving in an up and down direction covers a front of the sensor case and transmit the state to a control portion.

A width of the blocking plate may be made longer than a spacing distance between the first infrared sensor and the second infrared sensor.

The control portion may cover the first infrared sensor and the second infrared sensor spaced apart from each other at left and right distal ends of the blocking plate, and when signal sensing is blocked simultaneously or at intervals of less than a certain time, compression is considered as being performed in a vertical direction.

The control portion may consider that the compression is not being performed in a vertical direction when the left and right distal ends of the blocking plate are blocked from sensing signals at intervals of a certain time or more from the first infrared sensor and the second infrared sensor, which are spaced apart from each other, and may display a notification to a trainee by video or voice.

According to an embodiment of the present disclosure, when cardiopulmonary resuscitation is performed, it is possible to easily and accurately determine how deep the compression is, and to accurately sense whether the direction of compression is perpendicular to the ground, so trainees learning cardiopulmonary resuscitation can undergo an accurate training.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
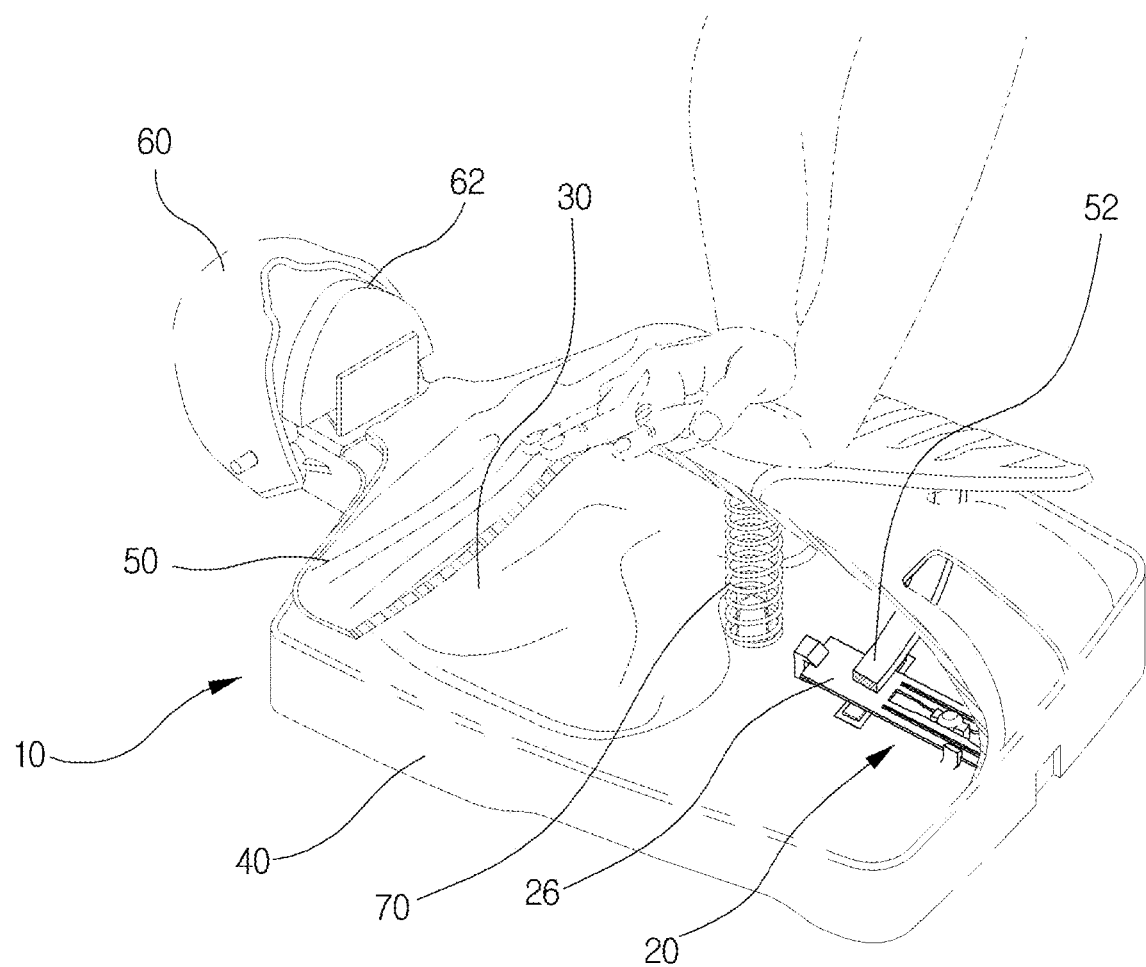
FIG. 1 is a perspective view showing the structure of a mannequin for training according to the related art.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
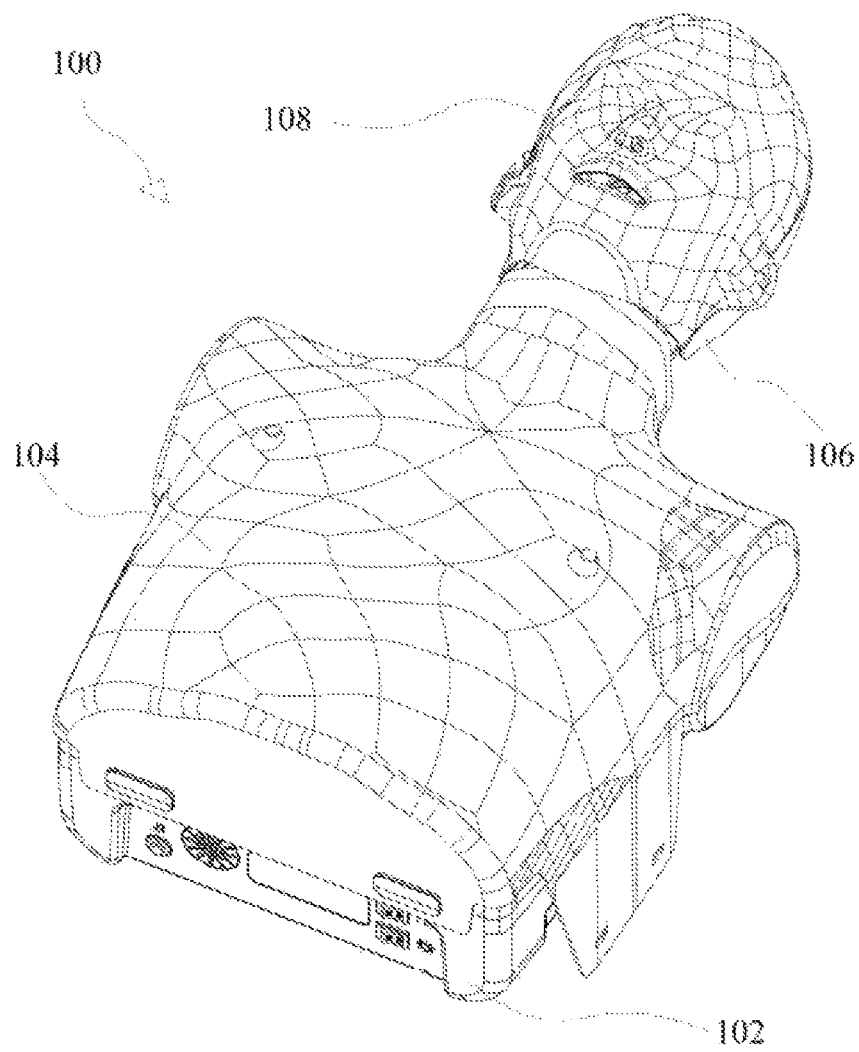
FIG. 2 is a perspective view showing the structure of a mannequin according to an embodiment of the present disclosure.
Figure 3:
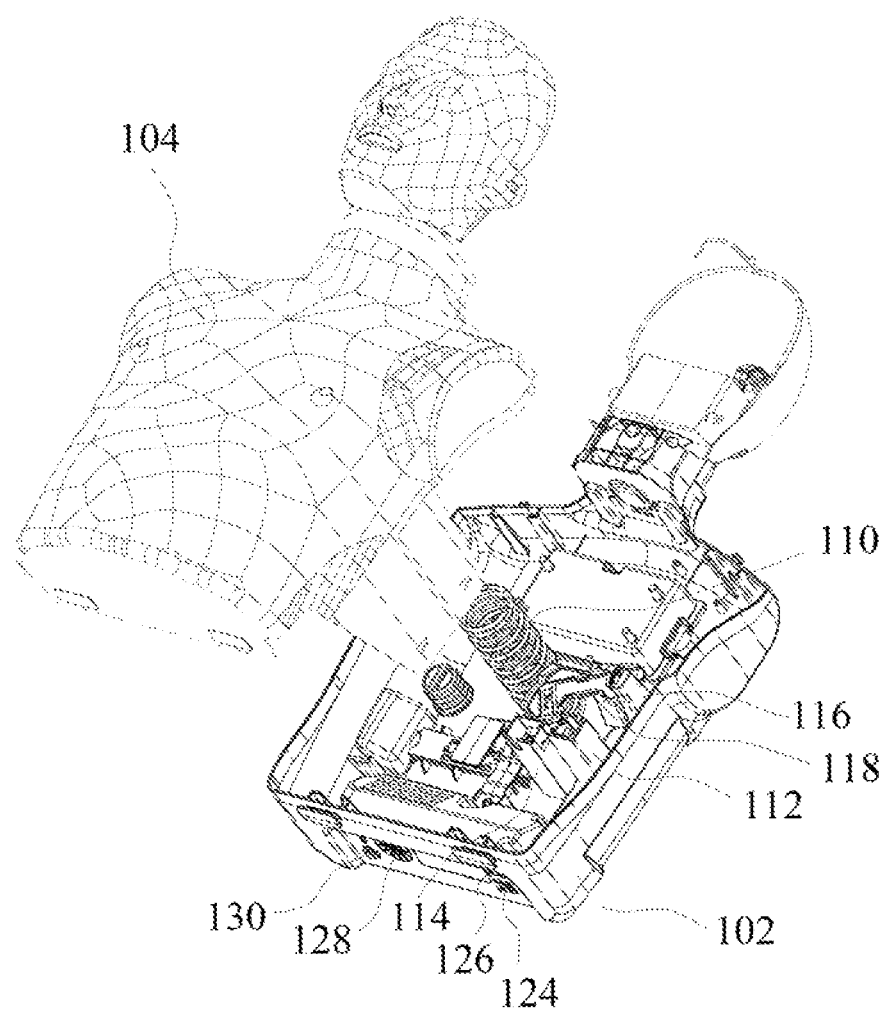
FIG. 3 shows an exploded perspective view showing a state in which the cover of the mannequin of FIG. 2 is separated.
Figure 4:
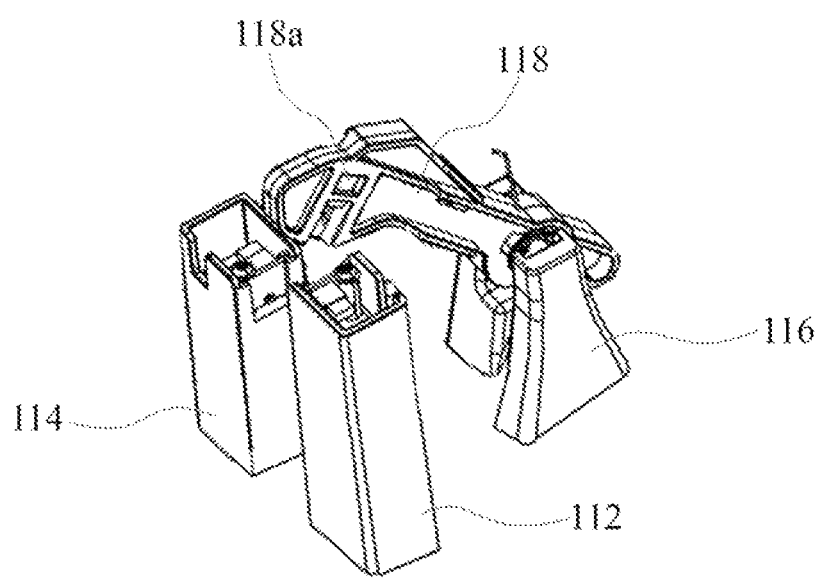
FIG. 4 is a perspective view showing the installation state of the pivoting arm.
Figure 5:
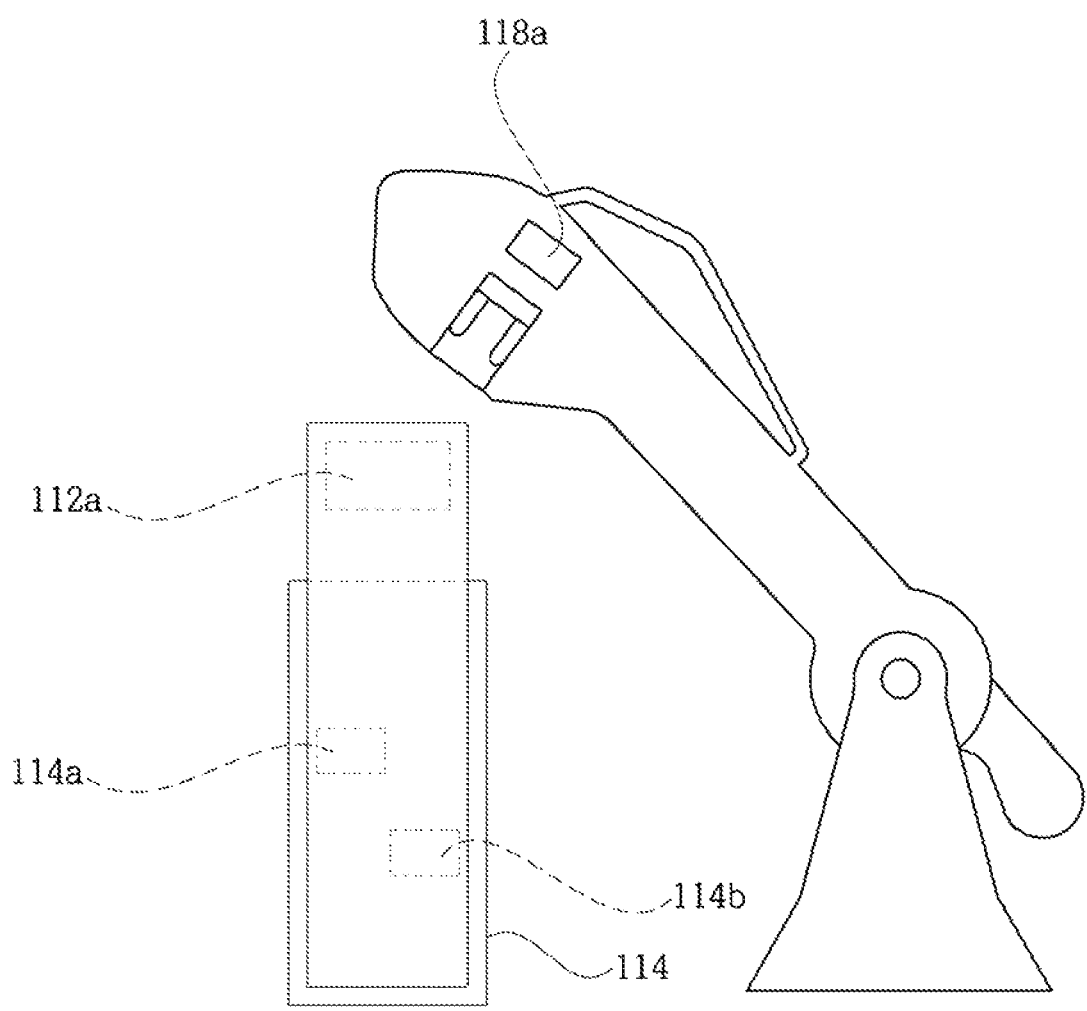
FIG. 5 is a side view showing the installation state of the pivoting arm.

FIG. 2 is a perspective view showing the structure of a mannequin according to an embodiment of the present disclosure. FIG. 3 shows an exploded perspective view showing a state in which the cover of the mannequin of FIG. 2 is separated. FIG. 4 is a perspective view showing the installation state of the pivoting arm. FIG. 5 is a side view showing the installation state of the pivoting arm. FIGS. 6 to 9 are side views showing the sensing states of the sensors according to the positions of the pivoting arms.

A mannequin 100 according to an embodiment of the present disclosure is made in a form similar to a human upper body. The mannequin 100 includes a torso and a head, and provides an environment for practicing cardiac compression and artificial respiration performed for cardiopulmonary resuscitation.

An empty space is formed inside the torso and head. Devices for checking the operation of cardiopulmonary resuscitation are installed therein.

The torso has a torso case 102 forming a back of the upper body and having a certain accommodation space formed therein (with an open front surface), and a torso cover 104 manufactured similar to a frontal appearance of a human upper body while covering the front surface of the torso case 102.

The head also has a head case 106 and a head cover 108 in a similar manner to the torso, and a display and other devices are installed in an inner space.

The head cover 108 covers the front surface of the head case 106 and is manufactured similar to a frontal appearance of a human face.

The torso and head are connected to a neck-joint portion and are pivoted forward and backward by a certain angle. The pivot movement of the head is preferably the same as that of a human body.

A spring 110 is installed on an inner bottom surface of the torso case 102. In accordance with an embodiment of the present disclosure, a coil-shaped spring 110 is illustrated as being used, but other types of elastic bodies may also be used as long as they exhibit an elastic force. The spring 110 pushes the torso cover 104 upward to return to its original position during heart compression. The spring 110 is preferably positioned at the center of the torso case 102.

On one side of the inner bottom surface of the torso case 102, two columns, which are defined as a first column 112 and a second column 114, respectively, are installed. The first column 112 is installed with a first sensor 112a, and the second column 114 is installed with a second sensor 114a and a third sensor 114b. The first sensor 112a, the second sensor 114a, and the third sensor 114b are magnetic force measurement sensors, and sense the proximity of a member (such as a magnet) for generating a magnetic field and transmit a signal to a control portion (not shown).

According to an embodiment of the present disclosure, the first sensor 112a, the second sensor 114a, and the third sensor 114b are devices of the same type and sense the same characteristic (magnetic force), but are installed at different heights from a bottom surface. For convenience, the first sensor 112a installed on the first column 112 is installed at a highest position, the second sensor 114a installed on the second column 114 is installed at a middle position, and the third sensor 114b is installed at a lowest position from the bottom surface.

On one side of the inner bottom surface of the torso case 102, a pivot-shaft column 116 into which a pivot shaft is inserted in the middle is installed. In addition, one distal end of a pivoting arm 118 pivoting at a certain angle is installed on the pivot shaft installed in the pivot-shaft column 116. The other distal end of the pivoting arm 118 pivots together with an upward and downward movement of the torso cover 104.

At the other distal end of the pivoting arm 118, a member for generating a magnetic force is installed, and a magnet 118a is generally used.

FIG. 4 is a perspective view showing the installation state of the pivoting arm. FIG. 5 is a side view showing the installation state of the pivoting arm. FIGS. 6 to 9 are side views showing the sensing states of the sensors according to the positions of the pivoting arms.

The pivoting arm 118 pivots about the pivot shaft that is installed in the pivot-shaft column 116 parallel to the ground installed in the pivot-shaft column 116. An upper end of the other distal end of the pivoting arm 118 is in contact with an undersurface of the torso cover 104 in the absence of any force, or is positioned at a height adjacent thereto.

Accordingly, when a trainee strongly presses the torso cover 104, the other distal end of the pivoting arm 118 is also lowered down.

The other distal end of the pivoting arm 118 reciprocates while pivoting in an up and down direction between the first column 112 and the second column 114, which are installed parallel to each other. As illustrated in FIGS. 4 and 5, when the pivoting arm 118 reciprocates between the two columns, the magnet 118a reciprocates between the first sensor 112a and the third sensor 114b.

The first sensor 112a to the third sensor 114b sense the magnetic force emitted from the reciprocating magnet 118 a, thereby checking the position of the magnet 118a. Since the position of the magnet 118a is the same as the position of the other distal end of the pivoting arm 118, the control portion may grasp the height of the pivoting arm 118.

Figure 6:
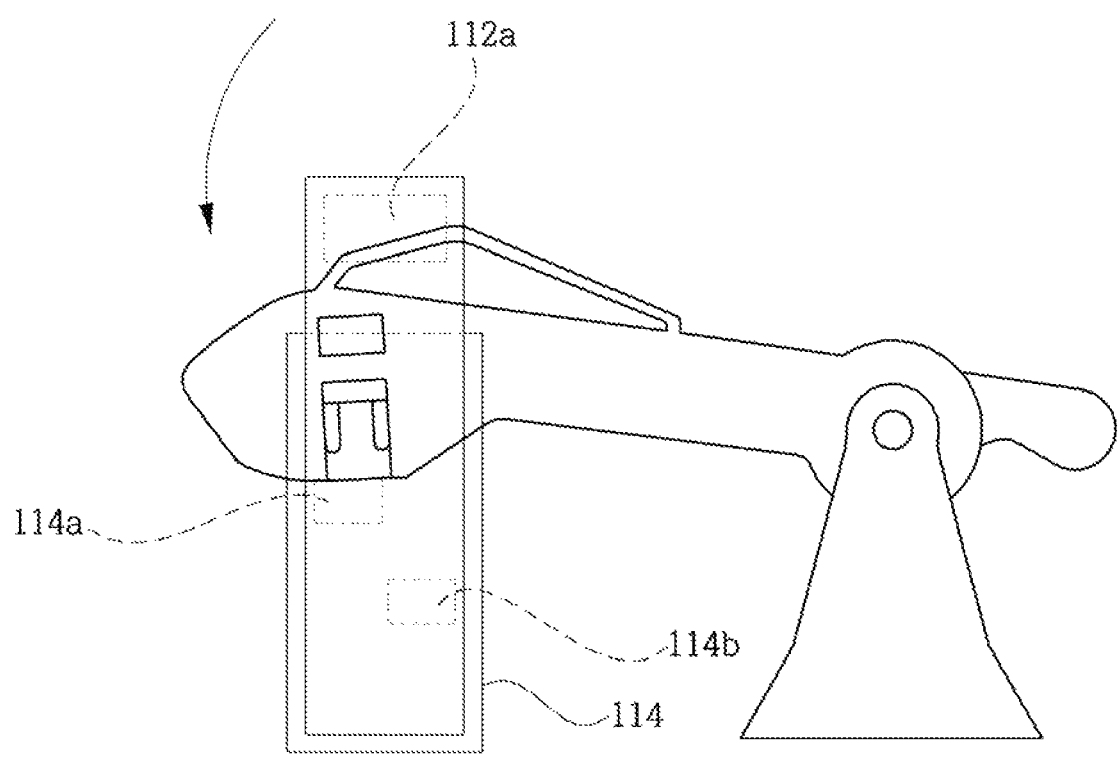
FIGS. 6 to 9 are side views showing the sensing states of the sensors according to the positions of the pivoting arms.

As shown in FIG. 6, when the pivoting arm 118 pivots downward and the magnet 118a passes down by the first sensor 112a and falls to the middle height between the first sensor 112a and the second sensor 114a, in the first sensor 112a, the magnetic force generated from the magnet 118a is sensed and then disappears, and in the second sensor 114a, the magnetic force is not yet sensed. In this connection, the control portion may determine that the magnet 118a is at a height between the first sensor 112a and the second sensor 114a. In other words, it may be determined that a trainee is performing cardiac compression, but has not yet pressed its lowest point.

Figure 7:
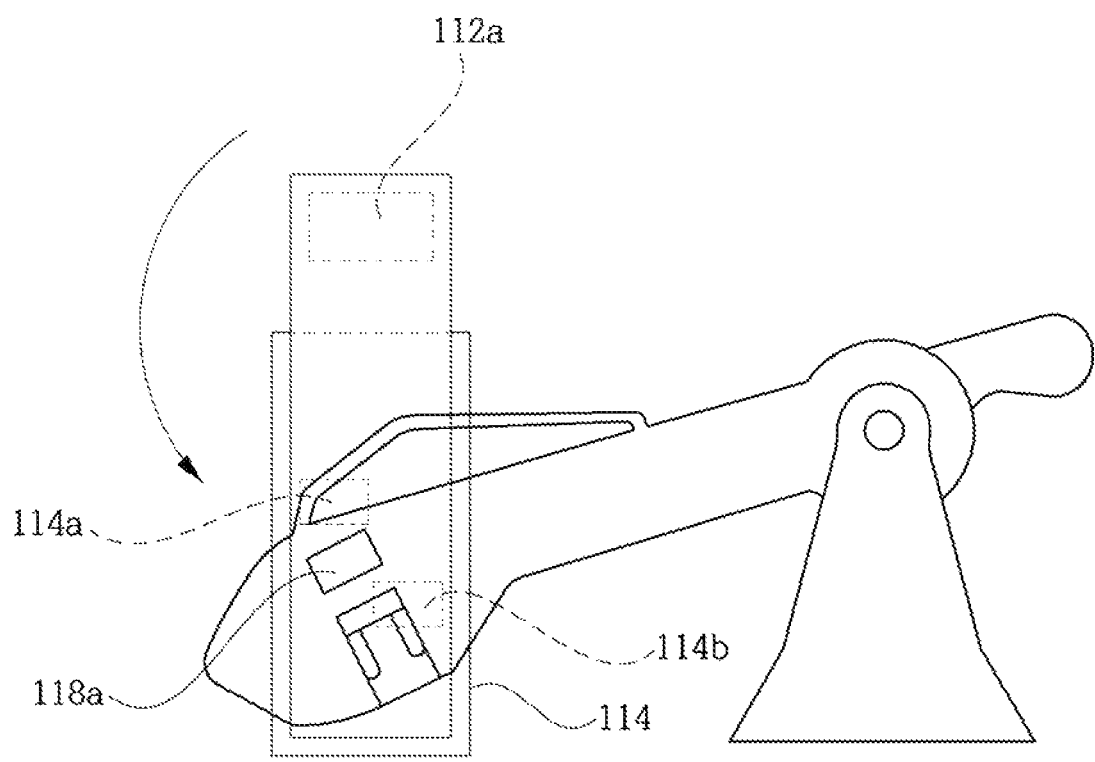

When the trainee adds compression and, as shown in FIG. 7, the pivoting arm 118 pivots further down, a magnetic force is also sensed at the second sensor 114a. The control portion determines that the depth of the compression at this time is sufficient.

Figure 8:
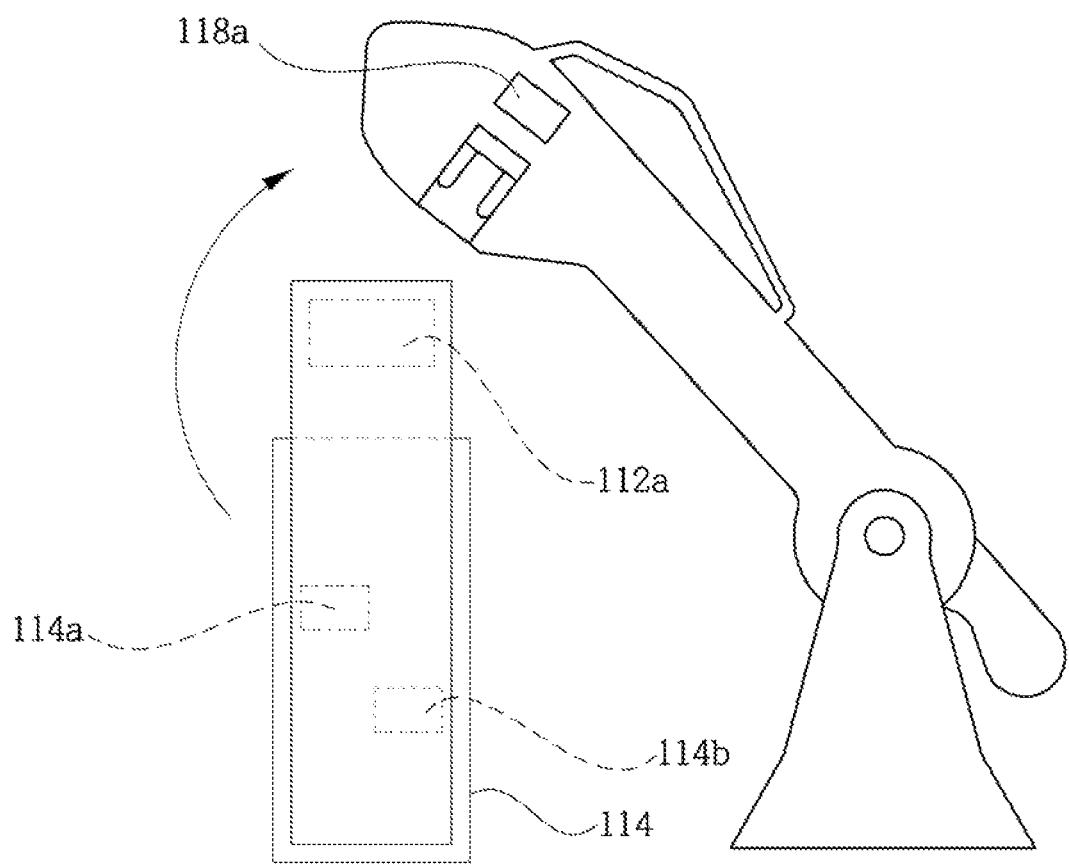

When the trainee removes the compression that presses the torso cover 104, the torso cover 104 returns to its original height by the elastic force of the spring 110. In this process, the pivoting arm 118 also pivots upwards. As illustrated in FIG. 8, the magnet 118a ascends with passing by the second sensor 114a and the first sensor 112a in this order. In other words, the control portion may check the magnetic force sensed by the second sensor 114a and the magnetic force sensed by the first sensor 112a, thereby determining that the pivoting arm 118 has returned to its original height.

This process may be regarded as one-time compression.

When the magnetic force is sensed only in the first sensor 112a and then disappears, and then sensed again in the first sensor 112a before it is sensed in the second sensor 114a and then disappears, it may be regarded that the pivoting arm 118 has risen again before lowering down sufficiently.

In general, cardiac compression depth in cardiopulmonary resuscitation needs to be at least 5 cm deep. When the height difference between the first sensor 112a and the second sensor 114a is set to about 5 cm, it may be regarded that sufficient compression is applied when a magnetic force is normally sensed from both the first sensor 112a and the second sensor 114a.

The mannequin 100 outputs a voice guidance indicating that the compression depth is not sufficient when the compression is not sufficiently applied to reach the depth where the second sensor 114a is positioned.

Further, when the magnetic force is sensed and disappeared sequentially from the first sensor 112a and the second sensor 114a, and then the magnetic force is sensed and disappeared again from the second sensor 114a, and the magnetic force is sensed and disappeared from the second sensor 114a once again, it may be regarded that the pivoting arm 118 has lowered down again in a state where it has not risen to the height of the first sensor 112a.

The compression motion of the heart needs to normally be sufficient to compress and relieve-compress the heart for the circulation of blood. The release of compression may be determined by checking that the pivoting arm 118 has been raised up sufficiently. In other words, the magnet 118a descending downward needs to come back up and then pass by the first sensor 112a. If not, the release of compression is not sufficient, so a warning therefor may be sent.

In this connection, a trainee may be informed of the quality of his/her compression motion by the device outputting a voice guidance informing that the relaxation of the compression is insufficient.

In conclusion, when sufficient compression to reach the normal depth and sufficient release are achieved, the magnetic force may be measured in the process of, first, disappearance after the first sensor senses, second, disappearance after the second sensor senses, third, disappearance after the second sensor senses, and fourth, disappearance after the first sensor senses.

In cardiopulmonary resuscitation, the chest needs to be pressed to a depth of at least 5 cm to help blood circulation while compressing the heart. However, pressing the chest to a much greater depth than this might result in broken ribs or damage to other organs. In an embodiment of the present disclosure, in order to prevent a trainee from pressing the chest excessively deeply, a function is implemented to sense over-compression and give a warning.

The second sensor 114a is configured to sense a minimum depth, but the third sensor 114b is configured to sense an excessive depth. In other words, when the magnet 118a is lowered down past the third sensor 114b while the pivoting arm 118 pivots excessively, the control portion may regard the same as over-compression. To this end, when the second sensor 114a is installed at a depth of about 5 cm, the third sensor 114b is installed at a depth of about 6 to 7 cm. Preferably, the third sensor 114b is installed 1 to 2 cm below the position where the second sensor 114a is installed.

Figure 9:
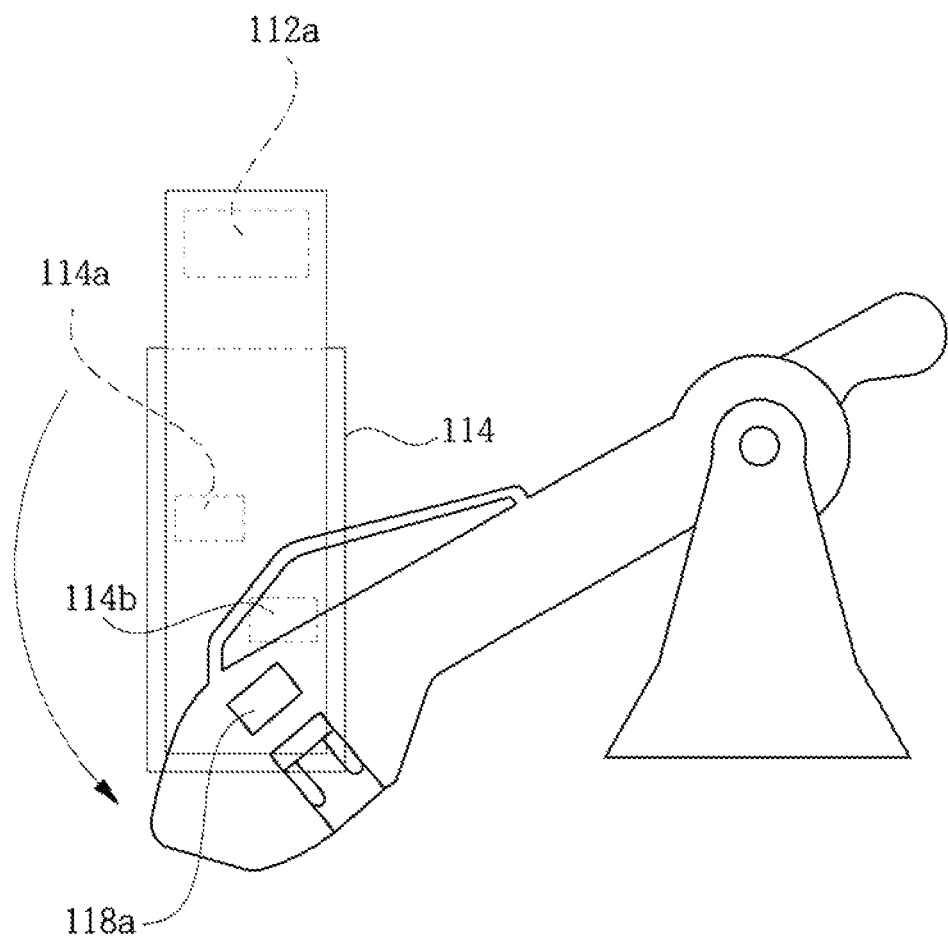

As shown in FIG. 9, when the magnetic force of the magnet 118a is sensed by the second sensor 114a and then disappears, and immediately thereafter, when the maximum value is sensed by the third sensor 114b, it is regarded that the pivoting arm 118 has pivoted to a lower side than the height at which the third sensor 114b is installed, and the control portion displays the occurrence of over-compression by voice or video.

In addition, the control portion may calculate how many normal compressions are being performed per unit time by measuring the time or period in which the magnetic field is sensed. When the calculated number of compressions per unit time is normal or abnormal, a video or voice warning may be given to a trainee.

In general, since an interval of chest compressions generally performed by trainees varies greatly depending on the trainees, according to the 2020 CPR Guidelines of the American Heart Association (AHA), it is recommended to perform chest compressions at a rate of 100 to 120 times per minute.

Figure 10:
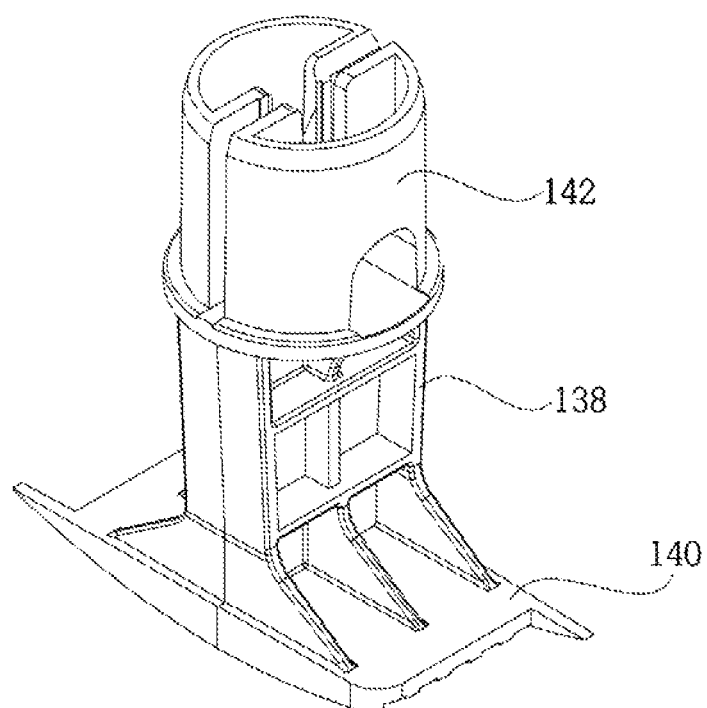
FIG. 10 is a perspective view showing the structure of a vertical sensor.
Figure 10:
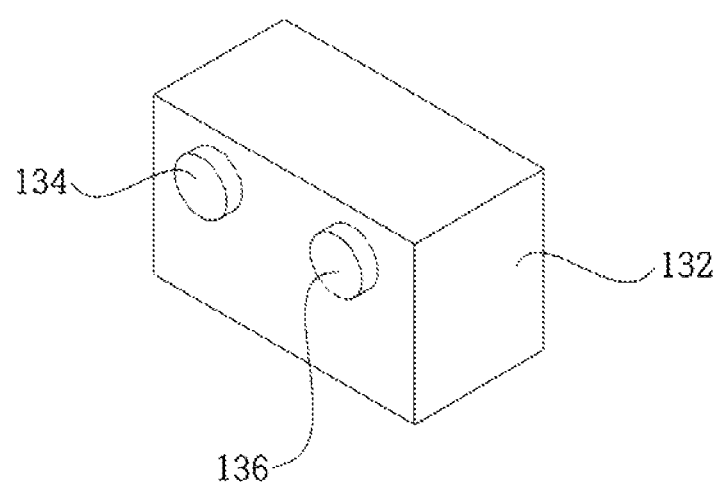
Figure 11:
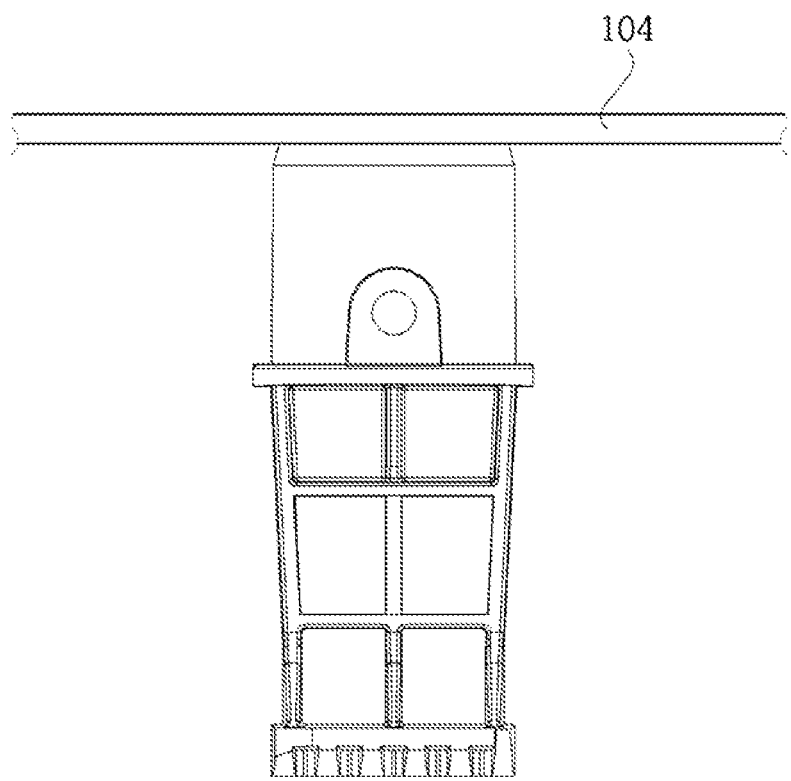
FIG. 11 is a front cross-sectional view showing a front structure of a vertical sensor.
Figure 11:
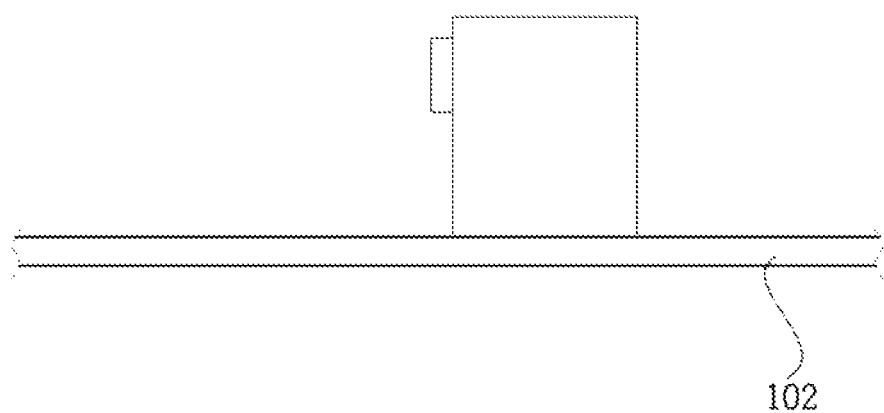
Figure 12:
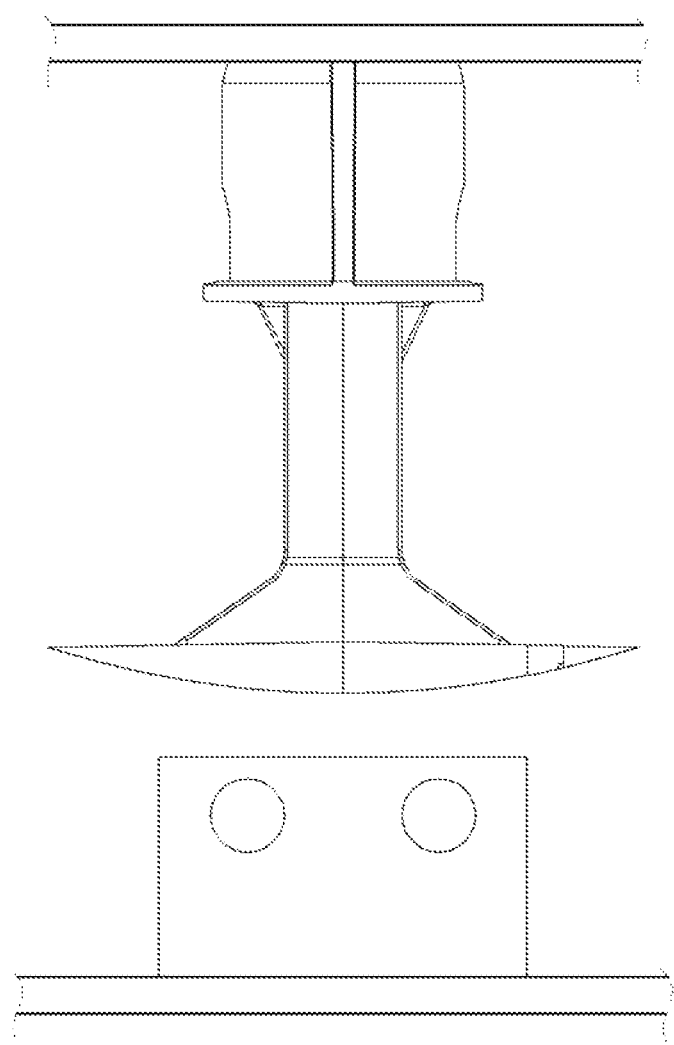
FIG. 12 is a side cross-sectional view showing a side structure of a vertical sensor.
Figure 13:
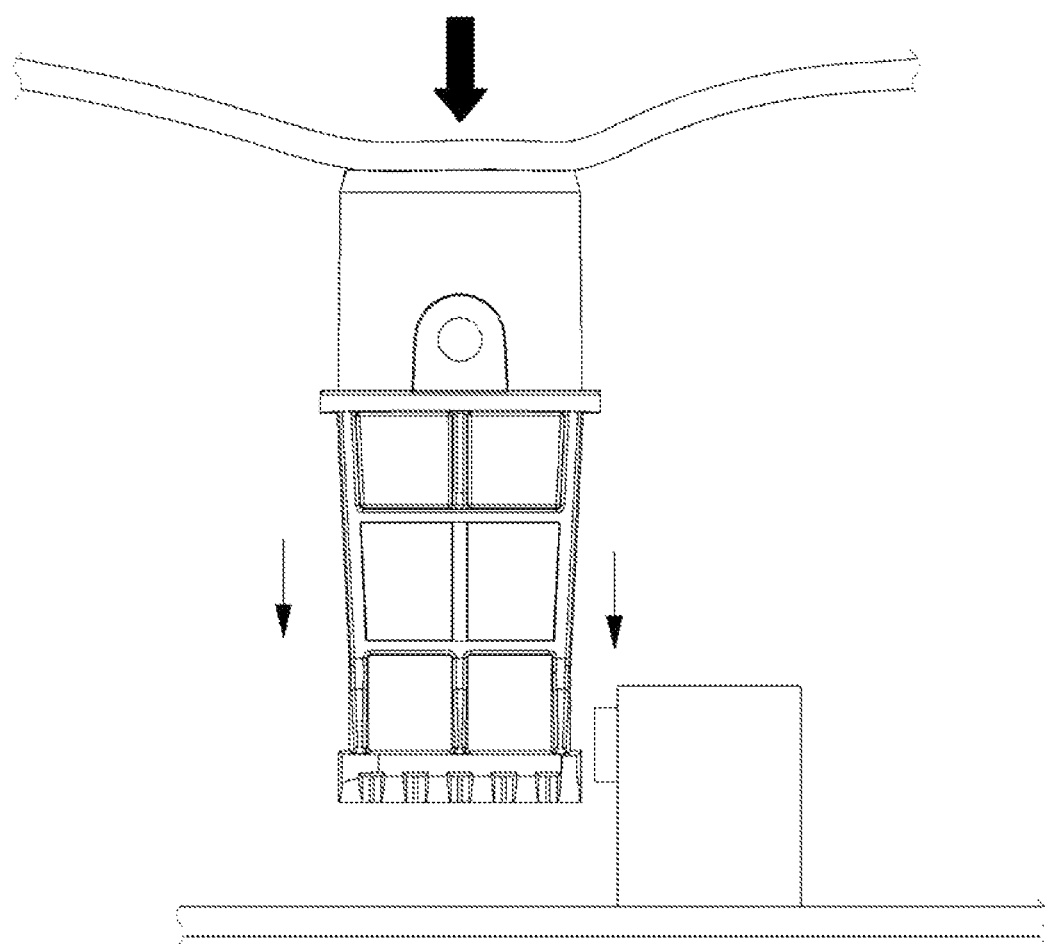
FIG. 13 is a side cross-sectional view showing a state in which a blocking plate is vertically lowered.
Figure 14:
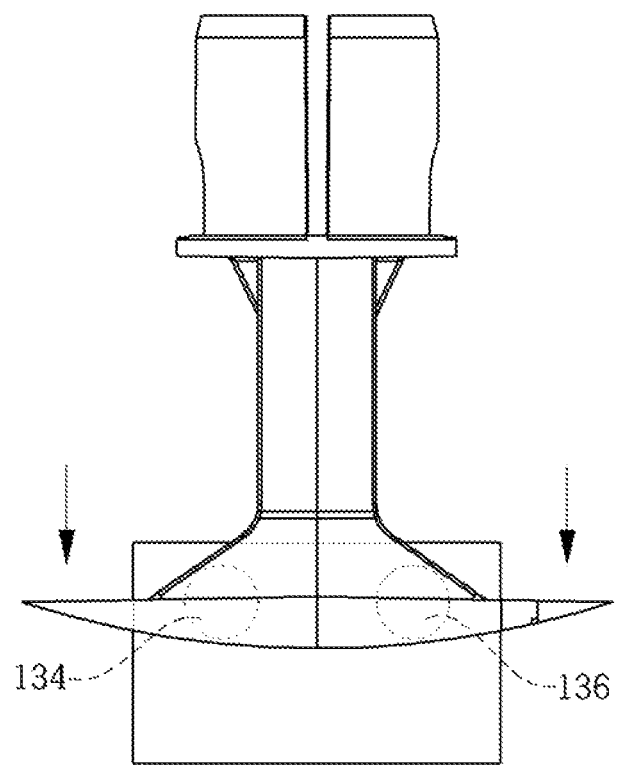
FIG. 14 is a front cross-sectional view showing a state in which the blocking plate is vertically lowered.
Figure 15:
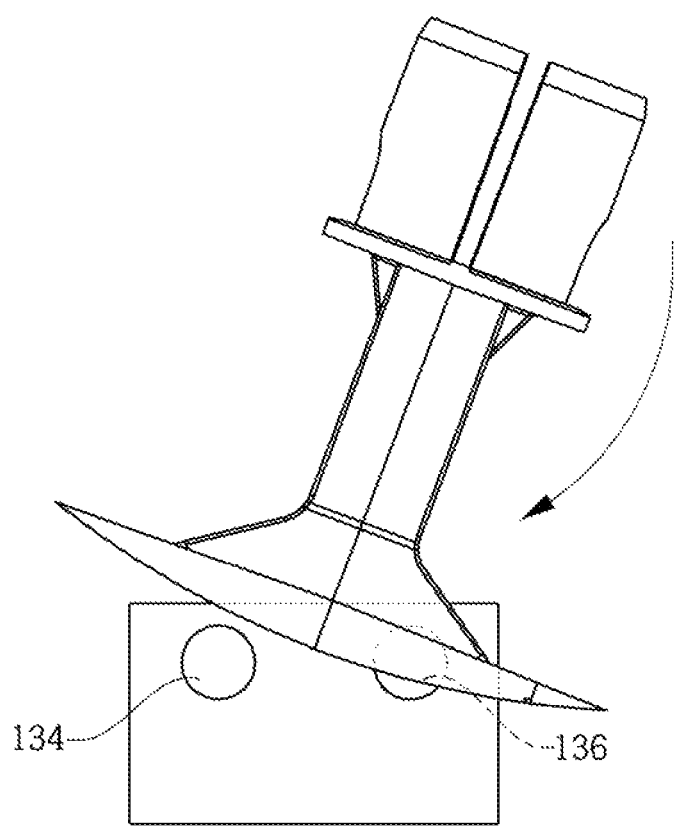
FIG. 15 is a front cross-sectional view showing a state in which the blocking plate is obliquely lowered.

FIG. 10 is a perspective view showing the structure of a vertical sensor. FIG. 11 is a front cross-sectional view showing a front structure of a vertical sensor. FIG. 12 is a side cross-sectional view showing a side structure of a vertical sensor. FIG. 13 is a side cross-sectional view showing a state in which the blocking plate is vertically lowered. FIG. 14 is a front cross-sectional view showing a state in which the blocking plate is vertically lowered. FIG. 15 is a front cross-sectional view showing a state in which the blocking plate is obliquely lowered.

In cardiopulmonary resuscitation, sufficient depth and constant speed in compression motions are important factors in saving a patient's life. In addition, it is also important to press vertically to ensure that the pressure is effectively transmitted to the heart, which is the target of compression.

In an embodiment of the present disclosure, a vertical sensor for checking whether the compression motion is performed in a vertical direction with respect to the ground is further provided.

The vertical sensor is configured to analyze whether the direction of the compression is vertical or oblique by sensing a sensing object moving in an up and down direction with left and right sensors spaced apart in a horizontal direction and checking whether the left or right sensor senses the object simultaneously.

As shown in FIGS. 10 and 11, the vertical sensor is configured of a sensor case 132 installed to protrude from the inner bottom surface of the torso case 102 and a blocking plate 140 moving in an up and down direction in front thereof. In the sensor case 132, the first infrared sensor 134 and the second infrared sensor 136 are installed to be spaced apart in the left and right directions. The first infrared sensor 134 and the second infrared sensor 136 are installed in the sensor case 132 so that a light emitting portion and a light receiving portion are disposed together. The first infrared sensor 134 and the second infrared sensor 136 operate in such a way that the light receiving portion senses infrared rays irradiated from the light emitting portion. When the blocking plate 140 moving in an up and down direction covers a front surface of the sensor case 132, the first infrared sensor 134 and the second infrared sensor 136 check a state in which infrared rays are not sensed, and then transmit the state to the control portion.

In an embodiment of the present disclosure, the first infrared sensor 134 and the second infrared sensor 136 are described as emitting and sensing infrared rays, but a sensor in the form of receiving and emitting visible rays using an LED may also be used. In addition, a sensor of a method using light, sound waves, and electromagnetic waves having straightness such as ultrasonic waves may also be used.

The first infrared sensor 134 and the second infrared sensor 136 are installed side by side on a front surface of the sensor case 132 in the left and right directions. In addition, it is preferable that the height of the sensor case 132 be such that it may cover the first infrared sensor 134 and the second infrared sensor 136 when the blocking plate 140 comes down.

An upper portion of the blocking plate 140 is configured of a columnar vertical bar 138, and the vertical bar 138 is connected to an undersurface of the torso cover 104 by a connection portion 142 at an upper end. Accordingly, when a trainee presses the central portion of the torso cover 104 and performs a compression motion, the blocking plate 140 connected thereunder descends downward to a front side of the sensor case 132. In addition, when descending to a sufficient depth, the blocking plate 140 meets the two infrared sensors.

The blocking plate 140 is long in left and right length enough to cover the two infrared sensors. To this end, it is preferable to manufacture the left and right length of the blocking plate 140 longer than a spacing distance between the first infrared sensor 134 and the second infrared sensor 136.

As shown in FIGS. 13 and 14, when a trainee presses the torso cover 104 in a vertical direction with respect to the ground, the horizontally elongated blocking plate 140 is lowered down in a state of equilibrium. As a result, the left and right distal ends of the blocking plate 140 cover the first infrared sensor 134 and the second infrared sensor 136 that are spaced apart from each other simultaneously or at a very short time interval. The control portion considers that the compression is being performed in a vertical direction when signal sensing of the first infrared sensor 134 and the second infrared sensor 136 is blocked almost simultaneously. In this connection, a separate alarm may not sound, or the vertical compression may be displayed by video or voice.

Depending on the setting, even when a sensor is not physically blocked simultaneously and when the sensor is blocked within a certain time interval, it may be considered as the same as being covered simultaneously. This time interval may vary depending on the size of a device, but may be set to about 0.1 second to 0.5 second.

As shown in FIG. 15, when a trainee compresses obliquely on the surface of the torso cover 104, the blocking plate 140 is inclined obliquely to the left or right while lowering down. The trainee may press the torso cover 104 obliquely in a longitudinal direction of the upper body. In this connection, the blocking plate 140 is obliquely inclined in the longitudinal direction of the upper body. Even when the upper body is inclined obliquely in the longitudinal direction, there is no big difference in the benefit of compressing the heart, so there is no issue in cardiopulmonary resuscitation.

However, when the blocking plate 140 is inclined obliquely in a width direction of the upper body, it is impossible to accurately perform cardiopulmonary resuscitation because the heart may not be accurately compressed. Accordingly, it is most desirable to dispose two sensors in the width direction of the upper body to prevent inclination to the left and right.

Then, the left and right sides of the blocking plate 140 are inclined to one side so that the first infrared sensor 134 and the second infrared sensor 136 may not be covered simultaneously. The control portion considers that the compression is not being performed in a vertical direction when the signal sensing of the first infrared sensor 134 and the second infrared sensor 136 is blocked at intervals of a certain time or more. In this connection, it is displayed to a trainee that it is not a normal compression motion by methods such as a warning sound, voice, or video.

The time difference may be adjusted according to a spacing distance between the first infrared sensor 134 and the second infrared sensor 136. In other words, when the first infrared sensor 134 and the second infrared sensor 136 are installed relatively close to each other, even when the blocking plate 140 obliquely descends, there is no significant difference in the sensing time of both sensors. However, when the distance between the two infrared sensors is long and even when the blocking plate 140 descends with a slight inclination, a difference in sensing time may occur and the inclination may be easily sensed.

In other words, a trainee or a manager of a device may change the degree (accuracy) of sensing the inclination of the blocking plate 140 by adjusting the distance between the first infrared sensor 134 and the second infrared sensor 136. Accordingly, the level of difficulty of training may be adjusted by adjusting the distance between the two infrared sensors according to the level of trainees who received less cardiopulmonary resuscitation education and those who received more cardiopulmonary resuscitation education.

The blocking plate 140 may use various materials such as plastic, metal, or rubber. In addition, configurations such as adjusting the color or attaching a film having a high reflective effect may be added for effective reflection of infrared rays. However, since the present disclosure does not limit the scope of right to the material or reflective efficiency of the blocking plate, it may be regarded that changes in this configuration may be easily changed by those skilled in the art.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A mannequin for cardiopulmonary resuscitation training configured of a head and a torso used to teach trainees cardiopulmonary resuscitation, the mannequin comprising:
    a torso case (102) having an open front surface and an inner space formed therein;
    a torso cover (104) manufactured similar to a frontal appearance of a human upper body while covering the front surface of the torso case (102);
    a head case (106) being connected to one side of the torso case (102) and having an inner space formed therein;
    a head cover (108) manufactured similar to a frontal appearance of a human face while covering the front surface of the head case (106);
    a spring (110) installed on an inner bottom surface of the torso case (102) to exert an elastic force to lift the torso cover (104) upward;
    a first column (112) installed on the inner bottom surface of the torso case (102), wherein the first column is installed with a first sensor (112a) for sensing a magnetic force;

a second column (114) installed on the inner bottom surface of the torso case (102), wherein the second column is installed with a second sensor (114a) for sensing a magnetic force at a relatively lower height than the first sensor (112a);

a pivoting arm (118) installed on the inner bottom surface of the torso case (102), wherein the pivoting arm has a distal end reciprocating in an up and down direction and a magnet (118a) installed at the distal end;

a sensor case (132) installed to protrude from the inner bottom surface of the torso case (102);

a first infrared sensor (134) and a second infrared sensor (136) installed to be spaced apart in a left and right direction in the sensor case (132); and a blocking plate (140) that is connected to an undersurface of the torso cover (104), moves in an up and down direction according to a compression motion of the torso cover (104), and blocks sensing of the first infrared sensor (134) or the second infrared sensor (136) while being lowered down by the compression motion of the trainee, wherein, when the blocking plate (140) moving in an up and down direction covers a front surface of the sensor case (132), the first infrared sensor (134) and the second infrared sensor (136) check a state in which infrared rays are not sensed, and then transmit the state to a control portion.

2. The mannequin of claim 1, wherein a left and right length of the blocking plate (140) is made longer than a spacing distance between the first infrared sensor (134) and the second infrared sensor (136).

3. The mannequin of claim 2, wherein the control portion covers the first infrared sensor (134) and the second infrared sensor (136) spaced apart from each other at left and right distal ends of the blocking plate (140), and when signal sensing is blocked simultaneously or at intervals of less than a certain time, compression is considered as being performed in a vertical direction.

4. The mannequin of claim 2, wherein the control portion considers that the compression is not being performed in a vertical direction when left and right distal ends of the blocking plate (140) are blocked from sensing signals at intervals of a certain time or more from the first infrared sensor (134) and the second infrared sensor (136), which are spaced apart from each other, and displays a notification to a trainee by video or voice.

* * * * *